Nov. 15, 1966     J. P. REPKO     3,285,499
BAG CLOSURE DEVICE

Filed Dec. 30, 1964     2 Sheets-Sheet 1

INVENTOR
JOHN P. REPKO
BY Jerome Rudy
ATTORNEY

Nov. 15, 1966 J. P. REPKO 3,285,499
BAG CLOSURE DEVICE

Filed Dec. 30, 1964 2 Sheets-Sheet 2

INVENTOR
JOHN P. REPKO

BY Jerome Rudy
ATTORNEY

United States Patent Office 3,285,499
Patented Nov. 15, 1966

3,285,499
BAG CLOSURE DEVICE
John P. Repko, Beaverton, Mich., assignor to The Dow Chemical Company, Midland, Mich., a corporation of Delaware
Filed Dec. 30, 1964, Ser. No. 422,205
6 Claims. (Cl. 229—62)

This invention relates to means for sealing flexible containers and more particularly to means for sealing pouch type containers formed by edge sealing one or more sides of two rectangularly shaped superimposed sheets.

Plastic bags such as are used in the packaging of sandwiches and similar food items have generally required a foreign implement such as a coated wire, a rubber band, a string or adhesive tape to seal the bag and thereby prevent loss of moisture or flavor, spoilage or staleness of the contents. The disadvantage of having to provide such separate means to seal the bag will be readily apparent.

It is an object of the present invention to provide a simple but effective sealing device for containers of the pouch type formed from superimposed sheets.

It is another object of the present invention to provide a sealing device which constitutes an integral part of the container and which can be readily incorporated during the fabrication of the container.

Other objects will become apparent from the following description and claims.

The objects of the present invention are accomplished by a generally rectangular container comprising two superimposed sheets having at least one heat-sealable thermoplastic resin surface forming the inner walls of said container, said sheets being marginally joined at three of the four edges, said fourth edge of the sheets forming the opening of the container, one of said sheets extending beyond the opening and forming a lip for said opening, said lip having attached to its opposite edges and forming an integral part of the container a thermoplastic resin tape parallel to the opening of said container, the length of said tape being substantially equal to the distance between the edges of said lip.

The container construction of the present invention including the sealing device and its use are further illustrated in the following drawings in which.

Figure 1:
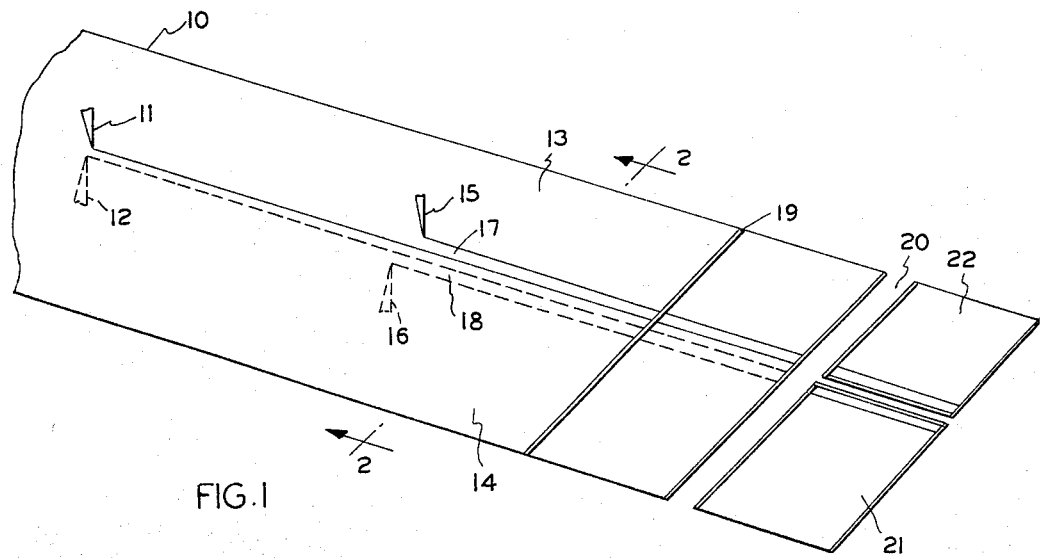
FIGURE 1 is a schematic view of one of the methods that can be employed to prepare the containers having the incorporated sealing device.
Figure 3:
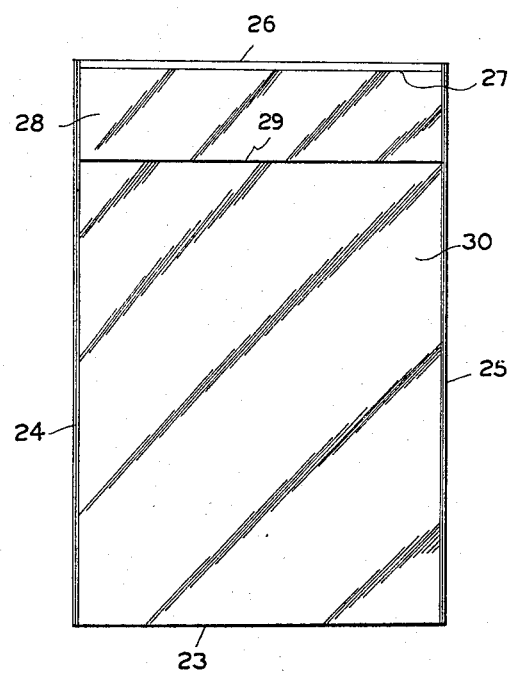
FIGURE 3 is a plan view of the container formed by the method illustrated in FIGURE 1.
Figure 2:
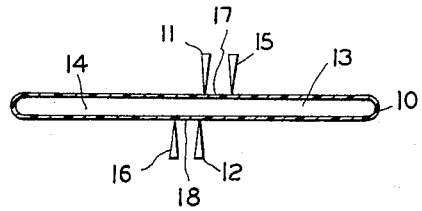
FIGURE 2 is a cross-sectional view taken along line 2—2'.
Figure 4:
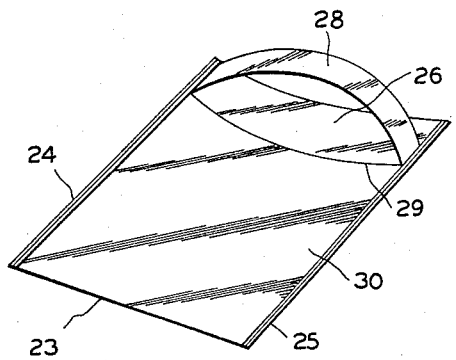
FIGURE 4 is a perspective view illustrating the container and its incorporated sealing device.

Referring to FIGURES 1 and 2, a continuous flattened tubular thermoplastic resin web 10 is cut in the machine direction by knife blades 11 and 12 to form two continuous lines of container blanks 13 and 14. The container blanks are then further cut by blades 15 and 16, resulting in the formation of the sealing tapes 17 and 18. The width of the sealing tape can be readily changed to suit a particular application and is not critical. For many applications a tape one-half inch in width was found to be satisfactory. The transverse edge seal 19 is then formed by strip sealers (not shown) and cut along its longitudinal center line 20 to result in two bags 21 and 22 containing the desired lip and sealing tape more specifically illustrated in FIGURES 3 and 4 showing the folded edge 23 and the heat-sealed side edges 24 and 25. Bag lip 26 may extend beyond the upper edge 27 of the sealing tape 28 or may be even with or below the edge of the tape. The sealing tape 28 is formed by cut 29 separating the tape from the container side 30 as illustrated hereinabove. The tape itself is sealed to the lip at edge seals 24 and 25. Cut 29 thus in effect forms the opening of the container while the lower sheet of the container extends beyond the opening formed by cut 29 in the form of lip 26. Instead of completely separating the tape from the container by cut 29, a perforated or scored tear line may be employed which allows the ready separation of the sealing tape from the body of the container when it is desired to seal the contents.

Figure 5:
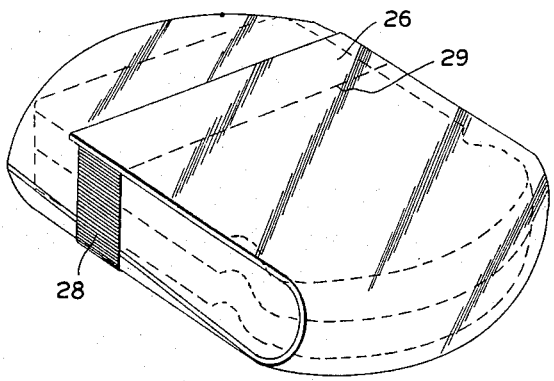
FIGURE 5 is a perspective view of the filled and sealed container.

In FIGURE 5 the container contents have been placed in the container and lip 26 folded back onto the container while the sealing tape 28 has been slipped over the container so that the opening of the container 29 covered by the lip 26 is sealed to the filled container by means of the sealing tape 28.

Figure 6:
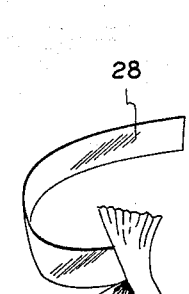
FIGURE 6 is a perspective view of an alternate means of sealing the container with the container-incorporated sealing device of the present invention.
Figure 6:
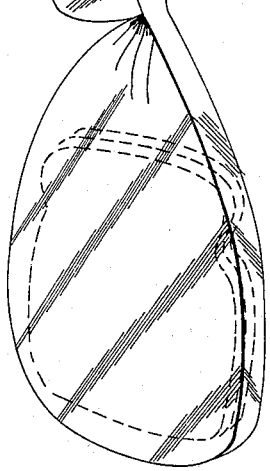

In FIGURE 6 an alternate means of employing the sealing tape to seal the container is illustrated wherein the tape 28 is cut or otherwise detached from one of the edges of the lip to which it is sealed and then can be wound around the gathered lip and opening of the container looped through itself and pulled tight.

Although the foregoing description of the sealing tape has been principally limited to a container obtained by folding a thermoplastic resin sheet of film, which is thereafter edge-sealed at the two side edges, it will be apparent that the same construction is also applicable to rectangularly shaped gusseted bags and many other bag constructions. The two sides of the container, furthermore, need not be of the same material. The thermoplastic resin web employed to form the container and the tape comprises preferably a polyolefin such as polyethylene, polypropylene, ethylene-propylene copolymers and similar heat sealable, film forming plastic materials. Laminated or coated webs of more than one thermoplastic resin may be employed for the container. It is further possible to employ resin coated webs having foil, paper or cellophane substrates for the container. Many alternate means of forming the container and the sealing tape as part of the container will be apparent to those skilled in the art.

One of the major advantages of the sealing device of the present invention is the ability of the sealing device to be formed simultaneously with the formation of the container employing the same web as is employed in the formation of the container. Instead of employing a tubular web as illustrated hereinabove it is possible to employ two separate webs one of which is cut to form the tape prior to edge sealing. Alternatively a folded web may be employed, one side of which is cut to form the tape prior to edge sealing. Although not preferred it is further possible to cut the thermoplastic tape after the sealing of the edges.

From a use standpoint the container-incorporated sealing device of the present invention has the advantage of not requiring an additional and separate implement to seal the container in addition to being readily adaptable to be produced in continuous container fabrication. It can be employed to tightly seal the container to prevent loss of liquid or gas for reasonable periods of time in the manner of a tie string or it can be employed to seal solid food or other solid contents in the manner of an elastic band, particularly if the contents are of the approximate size of the container. The band application is of particular value in the packaging of sandwiches. By folding the excess container walls back onto the container so that the lip covers the opening, a relatively tight seal is formed which prevents sandwiches from drying out for a long period of time. As contrasted to prior art containers employing flaps, the sealing device of the present invention allows complete sealing of the contents over the entire opening of the container. Particularly preferred are containers which have heat-sealed edges adjoining the opening since such edges being double the thickness of the container walls allow proper folding of the excess container walls back onto the container.

The invention has been described with particular reference to preferred embodiments thereof, but it will be understood that variations and modifications can be effected within the scope and spirit of the invention as described hereinabove and as defined in the appended claims.

What is claimed is:

1. A generally rectangular container comprising two superimposed sheets, said sheets having at least one heat-sealable thermoplastic resin surface forming the inner walls of said container, said sheets being joined at three of the four edges, said container having an opening extending the length of one of the edges of said sheets, one of said sheets extending beyond the other sheet and forming a lip for said opening, said lip having attached to its opposite edges a thermoplastic resin tape parallel to the opening of the container, said tape otherwise being unattached, the length of said tape being substantially the distance between the opposite edges of said lip.

2. The container of claim 1, wherein the thermoplastic resin tape extends across the inside of said lip.

3. The container of claim 1, wherein the edges of the container adjoining the opening are heat-sealed.

4. The container of claim 1, wherein the sheets are made of polyolefin.

5. The container of claim 1, wherein the polyolefin is polyethylene.

6. The container of claim 1, wherein the thermoplastic tape is a part of the sheets employed to form the container.

References Cited by the Examiner

UNITED STATES PATENTS

| | | | |
|---|---|---|---|
| 2,620,842 | 12/1952 | Hoeppner et al. | |
| 2,849,171 | 8/1953 | O'Brien | 229—54 X |
| 2,873,566 | 2/1959 | Sylvester et al | 53—29 |
| 2,929,180 | 3/1960 | Abrams et al | 53—29 |
| 3,107,842 | 10/1963 | Guilfoyle | 229—62 |
| 3,117,712 | 1/1964 | Kugler | 229—62 |

JOSEPH R. LECLAIR, *Primary Examiner.*

DAVID M. BOCKENEK, *Examiner.*